United States Patent [19]

Kurz

[11] 4,366,298

[45] Dec. 28, 1982

[54] PROCESS AND HEAVY METAL CATALYST FOR THE POLYMERIZATION OF α-OLEFINS, PARTICULARLY POLYETHYLENE

[75] Inventor: Dieter Kurz, Burghausen, Fed. Rep. of Germany

[73] Assignee: Wacker-Chemie GmbH, Munich, Fed. Rep. of Germany

[21] Appl. No.: 161,204

[22] Filed: Jun. 19, 1980

[30] Foreign Application Priority Data

Jul. 5, 1979 [DE] Fed. Rep. of Germany ....... 2927221
Jul. 31, 1979 [DE] Fed. Rep. of Germany ....... 2931045
Apr. 22, 1980 [DE] Fed. Rep. of Germany ....... 3015376

[51] Int. Cl.$^3$ .......................... C08F 4/02; C08F 10/00
[52] U.S. Cl. .................................. 526/125; 252/429 B; 526/114; 526/116; 526/124; 526/119; 526/352
[58] Field of Search ....................... 526/116, 119, 125

[56] References Cited

U.S. PATENT DOCUMENTS

| | | | |
|---|---|---|---|
| 4,097,409 | 6/1978 | Speakman | 526/124 |
| 4,109,071 | 8/1978 | Berger et al. | 526/114 |
| 4,115,319 | 9/1978 | Icata et al. | 526/125 |
| 4,226,964 | 10/1980 | Tanaka et al. | 526/114 |

FOREIGN PATENT DOCUMENTS

| | | | |
|---|---|---|---|
| 1170299 | 11/1969 | United Kingdom | 526/119 |
| 1292853 | 10/1972 | United Kingdom | 526/125 |
| 1305610 | 2/1973 | United Kingdom | 526/125 |

*Primary Examiner*—Edward J. Smith
*Attorney, Agent, or Firm*—Hammond & Littell, Weissenberger and Muserlian

[57] ABSTRACT

Poly-α-olefins, particularly polyethylene, having a broad molecular-weight distribution, can be prepared in the presence of a catalyst solid which is manufactured in two reaction steps, from a primary solid containing magnesium and chlorine which has been reacted, in a reaction stage A, with secondary and/or tertiary alcohols and with halogen-containing metal compounds of elements of IV and/or V sub-group(s) of the Mendeleev Periodic Table, and, in a reaction stage B, with halogen-containing metal compounds of elements of IV and/or V sub-group(s) of the Mendeleev Periodic Table and metal organyl compounds of metals of the II and/or III main group(s) of the Mendeleev Periodic Table. The sequence of the reaction stages A and B is not critical for the success of the process according to the invention.

12 Claims, No Drawings

4,366,298

PROCESS AND HEAVY METAL CATALYST FOR THE POLYMERIZATION OF α-OLEFINS, PARTICULARLY POLYETHYLENE

BACKGROUND OF THE INVENTION

The polymerization of α-olefins, especially ethylene, in the gaseous phase or in hydrocarbons as diluents and dispersants, with the aid of solid catalysts that contain elements of IV and/or V sub-group(s) of the Mendeleev Periodic Table, magnesium, halogen, oxygen and, optionally, boron or aluminum, and that have been activated with an alkyl aluminum, is known.

Because the properties of the polyolefins thus prepared are very strongly dependent on the catalyst used, various catalyst systems have already been proposed for the polymerization of the α-olefins.

In the polymerization of α-olefins, especially ethylene, the majority of the previously known solid catalysts activated with an alkyl aluminum yield products having a narrow molecular-weight distribution, that is to say, the mean polymerization degree of a polyolefin mixture produced in a polymerization batch lies within a narrow range. This narrow molecular-weight distribution of the polymerizate means that extruded products prepared therefrom have rough surfaces as a result of "melt fractures", so that these polymerizates are unsuitable for many uses, for example, for the manufacture of hollow articles and sheet materials.

The problem was, therefore, to manufacture polyolefins having a broad molecular-weight distribution.

Of the few known catalyst systems that yield products having a broad molecular-weight distribution, the majority cannot be used on an industrial scale because the grain properties of the polymerization product do not satisfy the requirements of the polymerization, working-up or further processing, or because the molecular-weight distribution is not sufficiently broad for many fields of application.

A further group of these catalyst systems has an unsatisfactory catalyst activity so that relatively large quantities have to be employed which pass into the polymerizate, impair its properties, especially its stability, and, therefore, have to be rendered harmless or removed in complicated subsequent processes.

Another group of these known catalyst systems yields products having broadly distributed molecular weights only when the polymerization is carried out in the presence of special activator mixtures, which have to be adhered to accurately, and another group only when the polymerization is carried out in the presence of additional auxiliaries, which subsequently have to be removed from the polymerization medium.

Another group of such known catalyst systems is unsuitable for use on a commercial scale because the physical properties, such as rigidity, impact strength and stress crack resistance, of the shaped articles produced from the polymerization product are inadequate for many purposes.

Some catalysts also discolor the product. These undesirable discolorations are caused chiefly by residual traces of catalysts, which, moreover, in many cases impair the stability of the product to light.

Reference is made to German published application DE-OS 26 35 298, corresponding to U.S. Pat. No. 4,064,334, for an example of a previously known catalyst. This catalyst is produced by grinding a mixture of magnesium halide, an alkoxy aluminum halide, a tetravalent titanium compound and a trivalent titanium compound. However, wall deposits are formed during polymerization, and the polymerizates themselves have a poor powder flow behavior, a low bulk density and a high proportion of fines.

OBJECTS OF THE INVENTION

An object of the present invention is to make available a polymerization process for α-olefins, particularly ethylene, which yields products having a broad molecular-weight distribution, good physical properties, good processibility and good purity.

Another object of the present invention is the development of a catalyst for the polymerization of an at least one α-olefin to give a polymerization having a broad molecular-weight distribution consisting essentially of a solid compound containing (1) element(s) of the IV and/or V sub-group(s) of the Mendeleev Periodic Table, (2) magnesium, (3) halogen, (4) oxygen, and possibly (5) element(s) of the II and/or III main group(s) of the Mendeleev Periodic Table, which solid compound is activated with at least one organometallic compound where said metal is from the II and/or III main group(s) of the Mendeleev Periodic Table, wherein said solid compound, prior to activation, is prepared by reacting a primary solid containing magnesium and halogen in two successive reacting stages A and B, in either order, where a solid based on magnesium compound(s) is reacted in reaction stage A with (i) an alcohol selected from the group consisting of secondary alkanols having from 3 to 12 carbon atoms, secondary cycloalkanols having from 5 to 8 carbon atoms, tertiary alkanols having from 4 to 18 carbon atoms and mixtures thereof, and (ii) at least one halogen-containing metal compound of one or more elements of the IV and/or V sub-group(s) of the Mendeleev Periodic Table, and, in reaction stage B, a solid based on magnesium compound(s) is reacted with (i) at least one halogen-containing metal compound of one or more elements of the IV and/or V sub-group(s) of the Mendeleev Periodic Table and (ii) at least one organometallic compound where said metal is from the II and/or III main group(s) of the Mendeleev Periodic Table.

A further object of the present invention is the development of an improvement in the process for the polymerization of an at least one α-olefin comprising reacting said α-olefin under elevated temperatures and pressures in the presence of a solid polymerization catalyst consisting essentially of a solid compound containing (1) element(s) of the IV and/or V sub-group(s) of the Mendeleev Periodic Table, (2) magnesium, (3) halogen, (4) oxygen, and possibly (5) element(s) of the II and/or III main group(s) of the Mendeleev Periodic Table, which solid compound is activated with at least one organometallic compound where said metal is from the II and/or III main group(s) of the Mendeleev Periodic Table, and recovering a polymerizate, the improvement consisting of preparing said solid compound prior to activation, by reacting a primary solid containing magnesium and halogen in two successive reacting stages A and B, in either order, where a solid based on magnesium compound(s) is reacted in reaction stage A with (i) an alcohol selected from the group consisting of secondary alkanols having from 3 to 12 carbon atoms, secondary cycloalkanols having from 5 to 8 carbon atoms, tertiary alkanols having from 4 to 18 carbon atoms and mixtures thereof, and (ii) at least one halogen-containing metal compound of one or more elements of the IV and/or V sub-group(s) of the Mendeleev Periodic Table, and, in reaction stage B, a solid based on magnesium compound(s) is reacted with (i) at least one halogen-containing metal compound of one or more elements of the IV and/or V sub-group(s) of the Mendeleev Periodic Table and (ii) at least one organometallic compound where said metal is from the II and/or III main group(s) of the Mendeleev Periodic Table, whereby a polymerizate is recovered having a broad molecular-weight distribution.

These and other objects of the invention will become more apparent as the description thereof proceeds.

DESCRIPTION OF THE INVENTION

The above objects have been achieved by the present invention.

The subject of the invention is a process for the discontinuous or continuous polymerization of α-olefins, in the gaseous phase or in hydrocarbons as a dispersing media, at a pressure of from 2 to 40 bar, preferably up to approximately 15 bar, and at a temperature of from 60° to 100° C., optionally with the use of hydrogen as molecular-weight regulator, in the presence of a solid material as catalyst that contains elements of the IV and/or V sub-group(s) of the Mendeleev Periodic Table of Elements, magnesium, halogen, oxygen and, optionally, a (further) element of the II and/or III main group(s) of the Periodic Table and that is activated by organometallic compounds of metals of the II and/or III main group(s) of the Periodic Table, characterized in that the catalyst, which is subsequently still to be activated for use in the polymerization of α-olefins, is prepared by reacting a primary solid containing magnesium and halogen in two successive reaction stages A and B, wherein the solid based on magnesium compound(s) is treated, in reaction stage A, with secondary or tertiary alcohols or mixtures of such alcohols and with halogen-containing metal compound(s) of one or more elements of the IV and/or V sub-group(s) of the Periodic Table and, in reaction stage B, is reacted with halogen-containing metal compounds of elements of the IV and/or V sub-group(s) and at least one organometallic compound of metals of the II and/or III main group(s) of the Periodic Table.

Compared to known catalysts of this type, the catalysts according to the invention give a polymerizate of an α-olefin, particularly ethylene, with a broad molecular-weight distribution, good physical properties, good processibility and good purity.

More particularly, the present invention relates to a catalyst for the polymerization of an at least one α-olefin to give a polymerizate having a broad molecular-weight distribution consisting essentially of a solid compound containing (1) element(s) of the IV and/or V sub-group(s) of the Mendeleev Periodic Table, (2) magnesium, (3) halogen, (4) oxygen, and possibly (5) element(s) of the II and/or III main group(s) of the Mendeleev Periodic Table, which solid compound is activated with at least one organometallic compound where said metal is from the II and/or III main group(s) of the Mendeleev Periodic Table, wherein said solid compound, prior to activation, is prepared by reacting a primary solid containing magnesium and halogen in two successive reacting stages A and B, in either order, where a solid based on magnesium compound(s) is reacted in reaction stage A with (i) an alcohol selected from the group consisting of secondary alkanols having from 3 to 12 carbon atoms, secondary cycloalkanols having from 5 to 8 carbon atoms, tertiary alkanols having from 4 to 18 carbon atoms and mixtures thereof, and (ii) at least one halogen-containing metal compound of one or more elements of the IV and/or V sub-group(s) of the Mendeleev Periodic Table, and, in reaction stage B, a solid based on magnesium compound(s) is reacted with (i) at least one halogen-containing metal compound of one or more elements of the IV and/or V sub-group(s) of the Mendeleev Periodic Table and (ii) at least one organometallic compound where the metal in said organometallic compound is from the II and/or III main group(s) of the Mendeleev Periodic Table; as well as the polymerizate produced employing the above catalyst.

The term a compound "containing an element" is understood to mean that the mentioned element is chemically bonded in the mentioned compound, and the term "Periodic Table" is understood to mean the Periodic Table according to Mendeleev (see "Handbook of Chemistry and Physics", 55th edition, inside cover).

All α-olefins that could previously be polymerized at pressures of from approximately 2 to 40 bar in the presence of solid catalysts of the so-called "Ziegler type" may be used as α-olefins that may be polymerized in accordance with the process of the invention. Ethylene, which is used alone or copolymerized in admixture with up to 10 mol% of α-alkenes having 3 to 6 carbon atoms, is preferred.

To prepare the catalyst used in the process according to the invention, a primary solid containing magnesium and halogen is used as starting material.

This primary solid may preferably be produced by reacting hydrocarbon-soluble magnesium compound(s) with a chlorohydrocarbon and/or carbon chloride compound(s) having in each case from 1 to 6 carbon atoms, of which at least one carries at least two directly bonded chlorine atoms.

Suitable hydrocarbon-soluble magnesium compounds, which may be used alone or in admixture, are especially organomagnesium compounds of the general formulae $R^1MgR^2$ and/or $R^1MgOR^2$, in which $R^1$ and $R^2$ are identical or different, straight-chain or branched alkyl radicals having from 2 to 20 carbon atoms or hydrocarbon aryl radicals having from 6 to 20 carbon atoms.

$R^1MgR^2$ compounds are especially preferred, for example, n-butyl-ethyl magnesium, di-n-butyl magnesium, n-butyl-isobutyl magnesium, n-butyl-sec-butyl magnesium, di-n-hexyl magnesium, di-n-pentyl magnesium, di-n-octyl magnesium, di-phenyl magnesium or mixtures of these compounds.

These organomagnesium compounds are especially preferably reacted with saturated chlorohydrocarbon and/or carbon chloride compounds, such as carbon tetrachloride, 1,1,1-trichloroethane, 1,1,2-trichloroethane, 1,1,2,2-tetrachloroethane, 1,1,1,2-tetrachloroethane, pentachloroethane, hexachloroethane or mixtures of these compounds. Chloroform is especially preferred, however.

The magnesium compound(s) and the organic chlorine compound, for example especially chloroform, are preferably reacted in quantities of from 0.5 to 10, and especially 1 to 4, mols of chlorine compound per mol or magnesium compound, preferably at temperatures of from −10° to 150° C., especially from 20° to 80° C., while stirring.

The duration of the reaction and the degree of dilution of the reactants is largely unimportant here. The reaction can be carried out within a few minutes or over several hours, for example, over a period ranging from 30 to 120 minutes. The degree of dilution can be varied within wide limits, for example, the organic chlorine compound such as the especially preferred chloroform, can be used in pure form as dissolved in hydrocarbons. The organomagnesium compound must be dissolved homogeneously in hydrocarbons, however, before commencing the reaction.

The reaction may be carried out in such a manner that the organic chlorine compound is added in portions to the dissolved magnesium compound, while stirring, or both reactants are metered simultaneously into the reaction container, while stirring. Preferably, however, the organic chlorine compound of the above-defined type, especially chloroform, is introduced in pure form or homogeneously dissolved in hydrocarbons, and the hydrocarbon solution of the organomagnesium compound(s) is added in portions, while stirring, because, in this manner, a catalyst solid especially well suited to the process of the invention can be produced.

The primary solid containing chlorine and magnesium and manufactured in the manner described can be further used directly, but preferably it is washed several times with hydrocarbons before further treatment.

A hydrocarbon or a mixture of hydrocarbons is then added to the primary solid so that a stirrable suspension is formed. The concentration is not critical but should be as concentrated as possible owing to the improved handling and the improved further reaction in the first reaction stage which then follows.

The order of the two successive reaction stages A and B is not critical for the success of the catalyst production or the polymerization process according to the invention. Thus, primary solid material prepared in the above-described manner may first be subjected to reaction stage A and, when this has finished, either reacted directly, or after an intermediate purification step, in reaction stage B. However, the reverse order of the reaction stages, preferably with an intermediate purification step, that is to say, reaction stage B before reaction stage A, is preferred.

The primary solid (or in the preferred embodiment of the preparation of the catalyst, the solid modified in reaction stage B) is reacted in reaction stage A with secondary and/or tertiary alcohol(s), particularly alcohols selected from the group consisting of secondary alkanols having from 3 to 12 carbon atoms, secondary cycloalkanols having from 5 to 8 carbon atoms, tertiary alkanols having from 4 to 18 carbon atoms, and mixtures thereof, preferably of the general formulae $R^3R^4R^5COH$ and $R^3R^4HCOH$ respectively, and with halogen-containing metal compound(s) of one or more elements of the IV and/or V sub-group(s) of the Periodic Table.

In this process it is possible first to add the mentioned metal compound(s) and then the alcohol(s) to the (primary) solid or to add both components simultaneously to the magnesium-containing solid, but, preferably, the suspension of the (primary) solid is treated first with the alcohol(s) and then at least one metal compound is added subsequently. Of course, the suspension of the solid may be added to the mentioned reactants, but in that case preferably the one reactant does not come into contact with the other reactant until it has been combined with the (primary) solid.

The reaction of the alcohols with the solid suspension is advantageously carried out at from $-20°$ to $150°$ C., preferably at from $0°$ to $100°$ C., and especially at from $20°$ to $60°$ C., and the reaction of the at least one metal compound with the solid suspension is carried out advantageously at from $-20°$ to $150°$ C., preferably at from $0°$ to $150°$ C., and especially at from $50°$ to $100°$ C.

If the halogen-containing metal compounds of metals of the IV and/or V sub-group(s) of the Periodic Table are liquid, they may be used in that state, but, preferably, and if they are not liquid, they are used in an as concentrated as possible solution in hydrocarbons.

The reaction times of this reaction stage A are not critical, and may range from a few minutes (for example 15 minutes) to several hours (for example 2 hours).

The secondary and/or tertiary alcohol is preferably used in an amount of from 0.01 to 1, especially from 0.1 to 0.5, mol per mol (gram atom) of magnesium contained in the solid, and the metal compound is preferably used in amounts of from 1 to 50, especially from 5 to 15, mols per mol of secondary and/or tertiary alcohol. Of course, these ranges need not be adhered to, but the activity of the catalyst is influenced in particular by the amount of alcohol, so that it is preferable not to deviate from the mentioned preferred ranges especially not to deviate from that one for the amount of alcohol.

Tertiary butanol and isopropanol are especially preferred as the preferred alcohols of the general formulae $R^3R^4HCOH$ and $R^3R^4R^5COH$ respectively, in which $R^3$, $R^4$ and $R^5$ represent identical or different, straight, chain saturated alkyl groups each having from 1 to 6 carbon atoms, or $R^3$ and $R^4$ together represent an alkylene group having 4 to 5 carbon atoms. Another example of a saturated secondary alcohol is cyclohexanol.

Halogen-containing metal compounds of elements of IV and/or V sub-group(s) of the Periodic Table are here preferably compounds of titanium, zirconium and vanadium, titanium compounds being especially preferred.

In reaction stage A of the catalyst production, compounds of the general formula

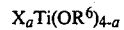
$$X_aTi(OR^6)_{4-a}$$

and, in reaction stage B described in detail hereinafter, compounds of the general formula

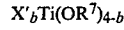
$$X'_bTi(OR^7)_{4-b}$$

have proved especially suitable. In these formulae, each of X and X' independently of one another, represents halogen, especially chlorine, each of $R^6$ and $R^7$, independently of one another, represents identical or different, straight-chain or branched alkyl radicals having from 1 to 8 carbon atoms and/or hydrocarbon aryl radicals having from 6 to 8 carbon atoms, and each of a and b, independently of one another, respresents 2, 3 or 4, preferably 4. The compounds may be used in pure form in each case, or as mixtures. Titanium tetrachloride is especially preferred in each case.

If reaction stage A is carried out as the first reaction stage in the preparation of the catalyst for the process according to the invention, the solid thus modified is then preferably freed from soluble metal compounds, especially titanium compounds at temperatures of from $0°$ to $100°$ C., especially from $20°$ to $100°$ C., by repeated washing with hydrocarbons, by allowing to settle and decanting. These washing operations are particularly preferred when the alcohols used in reaction stage A have also contained some primary alcohols. Preferably, the solid is then, in its turn, like the primary solid prior to the first reaction stage, suspended in hydrocarbons. The remarks referring to the concentration again apply here. The process is carried out in an analogous manner when reaction stage B, described hereinafter, is carried out as the first reaction stage of the catalyst manufacture.

The solid modified in reaction stage A, or, in the preferred manner of operation in which reaction stage A is carried out after reaction stage B, the primary solid, is reacted in reaction stage B with at least one halogen-containing compound of at least one element of the IV and/or V sub-group(s) of the Periodic Table, as defined hereinbefore, and with at least one organometallic compound of a metal of the II and/or III main group(s) of the Periodic Table.

The reaction is preferably carried out at temperatures of from −40° to 100° C., especially from −5° to 70° C., wherein preferably from 0.01 to 5, especially from 0.1 to 1, mol of the said metal compound of the sub-group elements, especially titanium tetrachloride, is used per mol of magnesium bonded in the solid, and preferably from 0.3 to 5, especially from 0.5 to 2.5, mols of the said organometallic compound of a metal of the main group elements are used per mol of the said metal compound of the sub-group of elements.

One mol of a mixture of substances means that amount of the mixture which theoretically (conversion = 100% of the theoretical value) reacts with the same amount of a reactant as would one mol of a pure substance that is contained in this mixture of substances.

The elements of the II and III main groups of the Periodic Table are understood here to mean, in particular, beryllium, magnesium, boron, and aluminum, preferably magnesium and especially aluminum.

The organometallic compounds of these elements are understood to mean those that contain the metal atoms bonded to alkyl radicals having from 1 to 20 carbon atoms and/or hydrocarbon aryl radicals having from 6 to 20 carbon atoms. Valencies of the metals not bonded to these said radicals may, furthermore, be satisfied by hydrogen and/or by halogen, preferably chlorine, and also by alkoxy and/or siloxy radicals, each having from 1 to 20 carbon atoms and/or hydrocarbon aryloxy radicals having from 6 to 20 carbon atoms. Furthermore, oligomeric alkyl aluminum compounds may be used, that is to say, compounds which, in addition to the above-mentioned substituents, also contain aluminum-oxygen-aluminum bonds. Compounds of the formula $AlR_z{}^8Y_{3-z}$ detected in detail hereinafter are preferred. Examples of preferred compounds of this kind are the following: triethyl aluminum, tri-n-butyl aluminum, triisobutyl aluminum, tri-n-octyl aluminum, "isoprenyl" aluminum, diethyl aluminum hydride, diisobutyl aluminum hydride, ethyl aluminum dichloride, diethyl aluminum chloride, ethyl aluminum sesquichloride, diethylethoxy aluminum, (ethyldimethylsiloxy)-diethyl aluminum, bis(diisopropyl aluminum) oxide, and mixtures thereof.

In the above-described reaction stage B, diethyl aluminum chloride, ethyl aluminum sesquichloride, "isoprenyl" aluminum, tri-n-octyl aluminum or mixtures of these compounds are especially preferred.

The reaction time of reaction stage B may vary from a few minutes (for example, 15 minutes) to several hours (for example, 2 hours) and is not critical.

Reaction stage B can be carried out in such a manner that first of all the main-group compounds, preferably dissolved in a hydrocarbon, for example, those of the above-mentioned aluminum compounds, and the primary solid, preferably suspended in hydrocarbons, or the solid modified in stage A, are combined, and thereafter the sub-group compounds, likewise preferably dissolved in hydrocarbons, for example, the preferred titanium tetrachloride, are added in portions. Simultaneous addition of the components is also possible. Preferably, however, the sub-group compound, for example, the preferred titanium tetrachloride, and the solid, both preferably dissolved or suspended respectively in hydrocarbons, are introduced and the main-group compounds, preferably the organyl aluminum compounds, are then added thereto.

Preferably, after modification in the two reaction stages A and B, at temperatures of from 0° to 100° C., the solid catalyst is substantially freed from soluble compounds by repeated washing with hydrocarbons, by allowing to settle and decanting.

Additionally or alternatively, it may be advantageous, especially when reaction stage B is carried out before reaction stage A as is especially preferred, to subject the solid catalyst after the second reaction stage to a subsequent treatment.

This subsequent treatment is carried out by reacting a stirrable suspension of the catalyst solid in hydrocarbons with one or more organyl metal compounds, preferably likewise dissolved in hydrocarbons, of the II and/or III sub-group(s) of the Periodic Table, as already defined hereinbefore. Of the preferred organyl aluminum compounds, in particular, diethyl aluminum chloride, ethyl aluminum sesquichloride, "isoprenyl" aluminum, tri-n-octyl aluminum and mixtures thereof, are preferred.

This additional subsequent treatment of the catalyst solid is preferably carried out at temperatures of from −40° to 150° C., especially from −20° to 100° C. with the use of preferably from 0.01 to 5 mols, especially from 0.1 to 1 mol, of the organyl metal compound(s) per mol of magnesium bonded in the solid.

The remarks made initially referring to the concentration of the solid suspension apply equally to all stages of the catalyst production. The reaction time of the subsequent treatment may likewise range from a few minutes to several hours (for example, 15 minutes to 2 hours).

A further advantageous possibility for the subsequent treatment, whether reaction stage A is carried out before or after reaction stage B, consists of ageing the solid in suspension for several hours, for example, for 2 to 8 hours, at temperatures of from 50° to 100° C., and then washing it.

The preparation of the catalyst solid and the execution of the polymerization according to the invention must be carried out with the exclusion of even small quantities of oxygen and water or water vapor.

The catalyst solid prepared in the above-described manner which has been freed, especially from soluble metal compounds, preferably by washing with hydrocarbons, preferably at temperatures of from 0° to 100° C., allowing to settle and decanting, is suitable for use in the polymerization according to the invention of those α-olefins which it was previously possible to polymerize in the presence of catalysts of the "Ziegler" type at pressures ranging from approximately 2 to 40 bar in the gaseous phase or in dispersion. In a preferred embodiment of the process according to the invention, ethylene in admixture with from 0 to 10 mol% of α-olefins, especially α-alkenes, having from 3 to 6 carbon atoms, for example, propene, but-1-ene, isobutene, pen-1-ene and hex-1-ene, is used and (co)polymerized.

Especially good results are obtained when ethylene is homopolymerized.

The polymerization initiated with the above-described catalyst system can be carried out in the gaseous phase or in suspension. In the preferred polymerization in suspension, the reactants, preferably dispersed in a hydrocarbon or a hydrocarbon mixture, are polymerized at pressures of from 2 to 40 bar (absolute), preferably from 2 to 11 bar, and at temperatures of from 60° to 100° C. In that operation, the chain length of the resulting polymerizates can be regulated optionally by the addition of hydrogen or, in other words, the polymerization degree of the products can be regulated.

The hydrocarbons employed are understood in the scope of this application to be saturated compounds that are composed of the elements carbon and hydrogen, such as straight-chain, branched and cyclic alkanes or paraffin hydrocarbons which are predominantly liquid at the stated temperatures and pressures, for example, alkanes having from 3 to 20 carbon atoms. Examples are propane, the butanes, the pentanes, the hexanes, the heptanes, the octanes, the nonanes, the decanes, decalin, cyclohexane and mixtures thereof.

To initiate the polymerization, the catalyst solid is activated by the addition of organyl metal compound(s) of metals of the II and/or III main group(s) of the Periodic Table.

Of the above already defined compounds of this kind, aluminum organic compounds of the general formula $AlR^8_zY_{3-z}$ or mixtures thereof are preferred, wherein $R^8$ represents identical or different, straight-chain or branched alkyl radicals having from 1 to 20 carbon atoms and/or hydrocarbon aryl radicals having from 6 to 20 carbon atoms, Y represents hydrogen and/or identical or different halogen atoms, alkoxy radicals, and/or siloxy radicals, each having from 1 to 20 carbon atoms and/or hydrocarbon aryloxy radicals having from 6 to 20 carbon atoms, and z is 2 or 3. Especially preferred are triisobutyl aluminum, tri-n-octyl aluminum and "isoprenyl" aluminum and mixtures thereof.

The oligomeric organyl aluminum compounds already described in the description of reaction stage B may also be used here.

The organyl metal compound of metals of the II and/or III main group(s) of the Periodic Table are preferably used in excess compared with the sub-group elements of the IV and V main groups bonded in the solid catalyst. It is, of course, also possible to use a deficiency or stoichiometric amounts. In a preferred embodiment, for example, from 2 to 100, especially from 5 to 50, mols of at least one aluminum compound is used per mol of titanium contained and chemically bonded in the catalyst solid.

The polymerization process according to the invention can be carried out continuously or discontinuously. In the discontinuous method, catalyst solid manufactured in the above-described manner, activator, α-olefin, optionally at least one hydrocarbon and optionally hydrogen are introduced into the reactor, preferably an autoclave, and the polymerization is then carried out. Of course, individual components or all of the components may be metered in subsequently, as a whole or partially.

In the continuous method, the said reactants are fed into the reactor continuously, separately or as a mixture, in the desired composition. Here, too, subsequent metering-in of partial amounts of individual components or all of the components is possible, and when using, for example, tube reactors, also metering in at different points of the reactor can be followed.

By the process according to the invention, polymerizates may be obtained which need not be subjected to any further treatment. This is achieved because of the small amount of catalyst system required as a result of its surprisingly high activity which does not have any marked detrimental effect on the product. A further advantage of the catalyst system is the manufacture of polymerizates having excellent powder properties, a broad distribution of molecular weight, very good physical properties and good processibility. For example, the polymerizates manufactured according to the invention can be shaped by blow-extrusion "free of melt fractures", for example to form hollow articles or sheet materials. Of the very good physical properties, only the high rigidity, the impact strength and the good stress crack resistance are mentioned.

The invention is explained in detail hereinafter by Examples and Comparison Examples. These are not to be deemed limitative, however.

EXAMPLES

The melt index $MFI_5$ mentioned in the Examples is determined in accordance with DIN (Deutsche Industrie Norm (German Industrial Standard)) 53 735 at 190° and 49.03 N (5 kp) stress.

The flow factor $F_{21.6}$ is the quotient of the melt indices at 211.82 N (21.6 kp) and 49.03 N (5 kp) stress and can be employed as a measure of the molecular weight distribution.

The catalyst which is used in the polymerization according to the invention can be manufactured, for example, in the following manners:

(a) Manufacture of the primary solid 900 ml of a hexane/heptane solution which contained 0.5 mol of n-butyl-sec-butyl magnesium, were added in portions, over a period of 2 hours, at 60° C. to 1 mol of chloroform in 420 ml of isooctane. A brown solid formed. The mixture was stirred for approximately half-an-hour at 60° C. and then the solid was washed at 50° to 60° C. three times with 3 liters of isooctane each time, with repeated settling and decanting. The mixture was then brought to 1 liter.

(b) Manufacture of the catalyst solid b 1—Reaction A followed by Reaction B 100 ml of the primary solid suspension manufactured according to (a), which contained 50 mmols of magnesium, were introduced into the reaction container and 20 mmols of isopropanol were added, while stirring, at room temperature. After stirring for one hour at 50° C., 100 mmols of $TiCl_4$ were added to the suspension. The mixture was heated to 90° C. and stirred for a further 2 hours at 90° C. The mixture was then cooled to 50° C. and the solid washed with isooctane by repeated settling and decanting until almost no dissolved titanium could be detected in the dispersant.

18.8 mmols of titanium were fixed on the solid.

The solid was suspended in 70 ml of isooctane, and 15 mmols of $TiCl_4$ were added thereto at room temperature. Then, while stirring, 30 mmols of ethyl aluminum sesquichloride, dissolved in 15 ml of isooctane, were added within a few minutes. After heating to 50° C., the mixture was stirred for 1 hour at 50° C., and then, with repeated settling and decanting, washed with isooctane at 50° C., until almost no dissolved chloride or dissolved aluminum could be detected in the dispersant.

A total of 33.2 mmols of titanium were fixed on the catalyst solid.

b 2—Reaction B followed by Reaction A 100 ml of the primary solid material manufactured according to (a) containing 50 mmols of magnesium were introduced into the reaction container and, at room temperature, 15 mmols of titanium tetrachloride were added thereto, while stirring. 30 mmols of ethyl aluminum sesquichloride dissolved in 15 ml of isooctane were then added in portions to the suspension within a period of a quarter of an hour. After heating to 50° C., the solution was stirred for a further one and a half hours and, at this temperature, washed with isooctane until almost no aluminum and no chloride could be detected in the decanted liquid.

The solid contained 14.5 mmols of bonded titanium.

After being taken up in 100 ml of isooctane, at room temperature and while stirring, 15 mmols of isopropanol, dissolved in 10 ml of isooctane were added in portions. The suspension was then stirred for 1 hour at 50° C. After the addition of 100 mmols of titanium tetrachloride, the mixture was heated to 90° C. and stirred for a further half-hour. After cooling to 50° C., a repeated washing operation was carried out until almost no dissolved titanium could be detected in the decanted isooctane.

It proved advantageous to take up the solid in 300 ml of isooctane again and to age it for 3 hours at 90° C. After repeated washing at 50° C. with isooctane, the catalyst solid contained a total of 21 mmols of bonded titanium.

b 3—Reaction B followed by Reaction A 100 ml of the primary solid suspension manufactured according to (a), which contained 50 mmols of magnesium, were introduced into the reaction container and 20 mmols of titanium tetrachloride were added at room temperature, while stirring. 30 mmols of ethyl aluminum sesquichloride, dissolved in 15 ml of isooctane, were then added in portions to the suspension within a period of a quarter of an hour. After heating to 50° C., the mixture was stirred for a further one and a half hours and at this temperature washed with isooctane until practically no aluminum and no chloride could be detected in the decanted liquid.

The solid contained 18.3 mmols of bonded titanium.

After being taken up in 100 ml of isooctane at room temperature, and while stirring, 15 mmols of isopropanol, dissolved in 10 ml of isooctane, were added in portions. The suspension was then stirred for 1 hour at 50° C. After the addition of 100 mmols of titanium tetrachloride, the mixture was heated to 90° C. and stirred for a further one hour. After cooling to 50° C., a repeated washing operation was carried out until almost no dissolved titanium could be detected in the decanted isooctane.

The further ageing treatment was carried out as in (b 2). The catalyst solid contained a total of 25.5 mmols of bonded titanium.

b 4—Reaction A followed by Reaction B 100 ml of the primary solid suspension manufactured according to (a), which contained 50 mmols of magnesium, were introduced into the reaction container and 15 mmols of tert-butanol were added at room temperature, while stirring. After 10 minutes' stirring, the suspension was heated to 90° C. within 20 minutes. 150 mmols of TiCl₄, dissolved in 20 ml of isooctane, were then added dropwise to the solution in the course of 5 minutes, while stirring. After stirring for one hour at 90° C., the mixture was cooled to 50° C., and the solid was washed with isooctane by repeated settling and decanting until almost no dissolved titanium could be detected in the dispersant. 11.2 mmols of titanium were fixed on the solid.

The solid was then suspended in 60 ml of isooctane and 11 mmols of TiCl₄ were added, the mixture was heated to 30° C., and, while stirring, 11 mmols of ethyl aluminum sesquichloride dissolved in 7.5 ml of isooctane were added dropwise to the solid suspension within half-an-hour. Stirring was then continued for a further 4 hours. After heating to 50° C., the solid was washed with isooctane by repeated settling and decanting until almost no dissolved chloride could be detected in the dispersant. 21.4 mmols of titanium were bonded on the catalyst solid.

b 5—Reaction A followed by Reaction B 100 ml of the primary solid suspension of (a) (corresponding to 50 mmols of bonded Mg) were treated in the first reaction stage as in (b 4). There were then a total of 11 mmols of titanium fixed to the solid.

The washed solid of the first reaction stage A was then suspended in 60 ml of isooctane, 12.5 mmols of TiCl₄ were then added, and the mixture was cooled to 0° C. While stirring, 11 mmols of ethyl aluminum sesquichloride, dissolved in 7.5 ml of isooctane, were then added dropwise to the solid suspension within half-an-hour.

For the subsequent reaction, stirring was continued for a further 4 hours at 0° C., and then for one hour at room temperature. The solid was then washed several times with isooctane at room temperature, settled and decanted until almost no chloride could be detected in the washing solution. The catalyst solid contained a total of 16.5 mmols of bonded titanium.

b 6—Reaction A followed by Reaction B 100 ml of the primary solid suspension of (a), which contained 50 mmols of magnesium, were introduced into the reaction container and heated to 50° C.

While stirring, 7.5 mmols of tert-butanol, dissolved in 20 ml of isooctane, were added dropwise to the suspension within 10 minutes. After a further 15 minutes' stirring, 75 mmols of TiCl₄, dissolved in 20 ml of isooctane, were added in portions within 10 minutes. The mixture was then heated to 90° C., and stirred for half-an-hour. After washing analogously to (b 4), 6 mmols of bonded titanium had deposited on the solid.

After suspending the solid in 80 ml of isooctane, 11 mmols of TiCl₄ were added at room temperature, the mixture was heated to 30° C. and, while stirring, 11 mmols of ethyl aluminum sesquichloride, dissolved in 75 ml of isooctane, were added dropwise within half-an-hour. Stirring was then continued for a further 4 hours at 30° C., and purification was carried out analogously to the method described under (b 4). There were 16.8 mmols of bonded titanium fixed on the primary solid.

b 7—Reaction A followed by Reaction B 100 ml of the primary solid suspension of (a), which contained 50 mmols of magnesium, were introduced at 50° C. into the reaction container, 10 mmols of tert-butanol were added and stirring was continued for a further 15 minutes.

After the addition of 100 mmols of TiCl$_4$, dissolved in 20 ml of isooctane, within 20 minutes at 50° C., the suspension was heated to 90° C., and stirred for a further half-hour. The purification of the solid treated in the first stage was carried out as described under (b 4). There were then 8.8 mmols of bonded titanium fixed to the solid.

After suspending the solid in 70 ml of isooctane and adding 25 mmols of TiCl$_4$, the mixture was cooled to 0° C., and, while stirring, 25 mmols of ethyl aluminum sesquichloride, dissolved in 14 ml of isooctane, were added dropwise to the suspension within half-an-hour. For the subsequent reaction, stirring was continued for a further 4 hours at 0° C., and for one hour at room temperature. After purification analogously to (b 5), there was a total of 26.5 mmols of bonded titanium fixed to the catalyst solid.

b 8—Reaction A followed by Reaction B 100 ml of the primary solid suspension of (a), which contained 50 mmols of magnesium, were introduced into the reaction container and heated to 50° C. After 15 mmols of tert-butanol had been added to the suspension, and after a further 15 minutes stirring, 37.5 mmols of titanium tetra-n-propylate and 112.5 mmols of TiCl$_4$, dissolved in 20 ml of isooctane, were added while stirring at 50° C. After heating to 90° C., the suspension was stirred for a further half-hour. After purification analogously to (b 4), the solid contained 18.7 mmols of bonded titanium.

After suspending the solid in 70 ml of isooctane and 11 mmols of TiCl$_4$, the mixture was heated to 30° C. and within half-an-hour, while stirring, 11 mmols of ethyl aluminum sesquichloride, dissolved in 7.5 ml of isooctane, were added dropwise to the suspension.

After a further treatment analogously to (b 4), there was a total of 28.2 mmols of titanium fixed on the catalyst solid.

b 9—Reaction B followed by Reaction A with subsequent Reaction 100 ml of the primary solid suspension prepared according to (a), which contained 50 mmols of magnesium, were introduced into the reaction container and 11 mmols of titanium tetrachloride were added thereto at 30° C., while stirring. 11 mmols of ethyl aluminum sesquichloride, dissolved in 7.5 ml of isooctane, were added in doses to the suspension within half-an-hour. After stirring for 4 hours at 30° C., the solid was heated to 50° C. and at this temperature washed with isooctane until almost no aluminum and no chloride could be detected in the decanted liquid.

The solid contained 10.6 mmols of bonded titanium.

After being taken up in 100 ml of isooctane, at room temperature, while stirring, 15 mmols of tert-butanol, dissolved in 8.5 ml of isooctane were added in portions. 150 mmols of titanium tetrachloride were then added. After heating to 50° C., stirring was continued for a further hour, and the solid was washed with isooctane, with repeated settling and decanting, until almost no titanium could be detected in the solvent.

The solvent was again suspended in 100 ml of isooctane and 12 mmols of ethyl aluminum sesquichloride were added and the mixture stirred for 1 hour at 50° C. After repeated washing at 50° C. with isooctane, the catalyst solid contained a total of 17 mmols of bonded titanium.

b 10—Reaction B followed by Reaction A with subsequent treatments 100 ml of the primary solid suspension according to (a) having 50 mmols of bonded magnesium were treated in the first reaction stage, as described under (b 9). After the washing, the solid contained 10.1 mmols of bonded titanium.

While stirring and at room temperature, within 5 to 10 minutes, 25 mmols of tert-butanol, dissolved in 7.5 ml of isooctane, were added in portions to a suspension of the solid prepared in the first reaction stage in 100 ml of isooctane. After addition of 150 mmols of titanium tetrachloride, the mixture was heated to 50° C., and stirred for one hour. After the washing, as described under (b 9), the solid was again suspended in 100 ml of isooctane.

(aa) 6 mmols of ethyl aluminum sesquichloride were added to 50 ml of this catalyst solid suspension and the whole was stirred for one hour at 50° C. After washing analogously to (b 9), the solid (25 mmols of bonded magnesium) contained a total of 12 mmols of bonded titanium.

(ab) 4.5 mmols of "isoprenyl" aluminum were added to 50 ml of the described catalyst solid suspension and the whole was stirred for one hour at 50° C. After washing analogously to (b 9), the catalyst solid (25 mmols of bonded magnesium) contained a total of 8.5 mmols of bonded titanium.

b 11—Reaction B followed by Reaction A 200 ml of a primary solid suspension manufactured according to (a), which contained 100 mmols of bonded magnesium, were introduced into the reaction container and 20 mmols of titanium tetrachloride were added, while stirring, at 30° C. After addition in portions of 25 mmols of ethyl aluminum sesquichloride, dissolved in 14 ml of isooctane, within half-an-hour, the suspension was stirred for a further 4 hours at 30° C. After washing several times with isooctane at room temperature and then at 50° C. until no aluminum and chloride could be detected in the decanted solvent, the solid, which contained 17 mmols of bonded titanium, was suspended in 250 ml of isooctane.

(ba) 8 mmols of tert-butanol were added to 50 ml of this solid suspension, which contained 20 mmols of bonded magnesium and 3.4 mmols of bonded titanium, and the whole was heated to 50° C. After stirring for one hour at 50° C., 50 mmols of titanium tetrachloride were added, the mixture was heated to 80° C., and stirring continued for a further half-hour at this temperature. After washing several times with isooctane at 80° C. until almost no dissolved titanium could be detected in the solvent, a total of 4.1 mmols of titanium were fixed on the solid.

(bb) A further 50 ml of the solid suspension were treated, as described under (ba), with 8 mmols of tert-butanol and 50 mmols of titanium tetrachloride, with the modification that after the addition of alcohol, stirring was carried out for one hour at room temperature. After washing, the solid contained a total of 4.6 mmols of bonded titanium.

(bc) 50 mmols of titanium tetrachloride and, after stirring for 5 minutes, 8 mmols of tert-butanol, were added to a further 50 ml of the solid suspension. The further treatment was carried out as described under (ba). The solid contained a total of 4.6 mmols of bonded titanium.

b 12—Reaction B followed by Reaction A 200 ml of the primary solid suspension manufactured under (a) which contained 100 mmols of magnesium, were introduced into the reaction container and 40 mmols of titanium tetrachloride were added at 30° C., while stirring. Within half-an-hour, 50 mmols of ethyl aluminum sesquichloride, dissolved in 28 ml of isooctane, were then added dropwise to the suspension. After stirring for 4 hours at 30° C., the solid was worked up analogously to (b 11). After this first reaction stage it contained a total of 37 mmols of bonded titanium.

(ca) Sufficient solid, modified in the above first reaction stage, was added to 50 ml of isooctane so that 20 mmols of magnesium and 7.4 mmols of titanium were contained in the suspension. This suspension was treated analogously to (b 11), (ba) with 8 mmols of tert-butanol and 50 mmols of titanium tetrachloride. After washing, the solid contained a total of 9.7 mmols of bonded titanium.

(cb) A solid suspension, which was prepared as described under (b 12) (ca), was treated according to (b 11) (ba) with 4 mmols, instead of 8 mmols, of tert-butanol and 25 mmols, instead of 50 mmols, of titanium tetrachloride. After working up, the solid contained a total of 8 mmols of bonded titanium.

(c) Manufacture of catalyst solids not prepared according to the invention c 1

(b 1) was repeated, but instead of isopropanol, n-propanol was used.

The catalyst solid contained a total of 15.9 mmols of bonded titanium.

c 2

(b 2) was repeated, but instead of isopropanol, n-propanol was used.

The catalyst solid contained a total of 19.6 mmols of bonded titanium.

c 3

100 ml of the primary solid suspension from (a) were treated as described under (b 4) with 15 mmols of tert-butanol and 150 mmols of $TiCl_4$. 11.2 mmols of bonded titanium were fixed to the solid.

c 4

14 mmols of $TiCl_4$ were added to 100 ml of the primary solid suspension from (a) and the whole was heated to 30° C. Within half-an-hour, while stirring, 14 mmols of ethyl aluminum sesquichloride, dissolved in 10 ml of isooctane, were added dropwise to the suspension and stirring was continued for a further 4 hours. After heating to 50° C., the solid was washed at 50° C. in accordance with (b 4). The catalyst contained 13.8 mmols of bonded titanium.

c 5

15 mmols of tert-butanol in 8.5 ml of isooctane were added to 100 ml of the primary solid suspension from (a) which contained 50 mmols of bonded magnesium, and the mixture was stirred for about 10 minutes. After addition of 150 mmols of titanium tetrachloride and heating to 50° C., the mixture was stirred for one hour and worked up analogously to (b 4). The solid contained 11.4 mmols of bonded titanium.

POLYMERIZATION

Examples 1 to 45 and Comparison Examples A–J

The polymerization was carried out in a 1-liter or 5-liter laboratory autoclave in 700 ml and 3500 ml of isooctane respectively, while stirring at 350 and 650 rpm respectively, at 10 bar total pressure and 85° C.

The tests with the polymerization results are summarized in Tables 1 to 3.

The superiority of the polymerization process according to the invention is apparent from the Table.

Whereas it was possible to extrude the products of Examples 1 to 45 with no "melt fractures", the extruded products of Comparison Examples A to J displayed moderate to considerable melt fractures.

TABLE 1

| Examples and Comparison Examples | Catalyst prepared according to | mg Ti bonded to the catalyst | Activator 2 ml | Vol. % $H_2$ in gas space | °C. | time in hours | gm Polyethylene | Polymerization Values | | Bulk density gm/l | Proportion of fines <100 μm in % |
|---|---|---|---|---|---|---|---|---|---|---|---|
| | | | | | | | | $MFI_5/F_{21.6}$ (Powder) | $MFI_5/F_{21.6}$ (Granulate) | | |
| 1 | b(1) | 16.2 | Al "isoprenyl" | 16 | 90 | 1.75 | 1240 | 0.25/17.2 | 0.19/20.5 | 440 | 0.0 |
| 2 | b(1) | 18.9 | Al "isoprenyl" | 25 | 90 | 1.75 | 1150 | 1.1/17.4 | 1.0/18.9 | 465 | 0.3 |
| 3 | b(2) | 15.3 | Al "isoprenyl" | 27 | 90 | 1.5 | 1240 | 0.59/18 | 0.48/20.8 | 400 | 0.1 |
| 4 | b(2) | 13.6 | Al "isoprenyl" | 24 | 90 | 1.5 | 1265 | 0.41/17.6 | 0.35/20.0 | 400 | 0.1 |
| 5 | b(2) | 10.3 | Al "isoprenyl" | 17 | 90 | 1.5 | 1135 | 0.14/17.9 | 0.10/23.3 | 370 | 0.1 |
| 6 | b(2) | 15.3 | $Al(n-C_8H_{17})_3$ | 32 | 90 | 1.5 | 1080 | 0.99/16.9 | 0.83/18.7 | 395 | 0.0 |
| 7 | b(3) | 15.6 | Al "isoprenyl" | 24 | 90 | 1.5 | 1140 | 0.22/20.5 | 0.19/21.6 | 410 | 0.3 |
| 8 | b(3) | 15.6 | Al "isoprenyl" | 27 | 90 | 1.75 | 1260 | 0.38/20 | 0.36/21.4 | 425 | 0.1 |
| 9 | b(3) | 17.5 | Al "isoprenyl" | 36 | 90 | 2 | 1200 | 1.00/19.6 | 0.93/20.4 | 430 | 0.3 |
| 10 | b(3) | 17.8 | $Al(n-C_8H_{17})_3$ | 31 | 90 | 1.5 | 1143 | 0.51/20.6 | 0.51/21.8 | 430 | 0.3 |
| A | c(1) | 10.1 | Al "isoprenyl" | 21 | 90 | 1.5 | 1180 | 0.8/14.1 | — | 385 | 0.2 |
| B | c(2) | 15.5 | Al "isoprenyl" | 24 | 90 | 1.5 | 1200 | 0.43/16.4 | 0.36/16.7 | 420 | 0.1 |
| C | c(2) | 18.5 | Al "isoprenyl" | 30 | 90 | 1.5 | 1160 | 1.10/16.7 | 0.93/17.0 | 415 | 0.0 |

TABLE 2

| Examples and Comparison Examples | Catalyst Prepared according to | Auto-Clave | mg bonded $Ti^{(1)}$ | ml $AlR_3$ | Vol. % $H_2$ in gas space | °C. | Time in hours | gm $PE^{(2)}$ | $MFI_5$ (Powder) | $F_{21.6}$ | Bulk Density g/l | Proportion of fines <100 μm in % by weight |
|---|---|---|---|---|---|---|---|---|---|---|---|---|
| 11 | b4 | 1 l | 3.1 | 0.3 $Al(n-C_8H_{17})_3$ | 27 | 85 | 2 | 220 | 0.38 | 18.7 | 390 | 0.2 |
| 12 | b4 | 1 l | 3.1 | 0.3 Al isoprenyl | 27 | 85 | 2 | 271 | 1.2 | 18.8 | 408 | 0.3 |
| 13 | b4 | 1 l | 3.1 | 0.3 Al isoprenyl | 17 | 85 | 2 | 310 | 0.33 | 18.4 | 400 | 0.3 |
| 14 | b4 | 1 l | 3.1 | 0.26 $Al(n-C_8H_{17})_3$ 0.04 $Al(i-C_4H_9)_3$ | 27 | 85 | 2 | 270 | 0.8 | 19.1 | 390 | 0.4 |
| 15 | b4 | 5 l | 17 | 2 Al isoprenyl | 33 | 85 | 2 | 1200 | 1.0 | 18.5 | 397 | 0.1 |
| 16 | b4 | 5 l | 17 | 2 Al isoprenyl | 36 | 85 | 2 | 1190 | 1.3 | 18.4 | 393 | 0.1 |
| 17 | b5 | 1 l | 2.6 | 0.3 Al isoprenyl | 27 | 85 | 2 | 220 | 0.9 | 17.0 | 375 | 0.3 |

TABLE 2-continued

| Examples and Comparison Examples | Catalyst Prepared according to | Auto-Clave | mg bonded Ti[1] | ml AlR3 | Vol. % H2 in gas space | °C. | Time in hours | gm PE[2] | MFI5 (Powder) | F21.6 | Bulk Density g/l | Proportion of fines <100 μm in % by weight |
|---|---|---|---|---|---|---|---|---|---|---|---|---|
| 18 | b5 | 1 l | 3.6 | 0.3 Al(n-C8H17)3 | 27 | 85 | 2 | 331 | 0.31 | 18.7 | 350 | 0.1 |
| 19 | b5 | 1 l | 3.6 | 0.2 Al(i-C4H9)3 | 27 | 85 | 1.5 | 354 | 2.8 | 15.0 | 382 | 0.1 |
| 20 | b6 | 1 l | 3.4 | 0.3 Al(n-C8H17)3 | 27 | 85 | 2 | 285 | 0.69 | 18.8 | 380 | 0.1 |
| 21 | b6 | 1 l | 3.4 | 0.3 Al isoprenyl | 27 | 85 | 2 | 334 | 1.4 | 17.0 | 419 | 0.3 |
| 22 | b7 | 1 l | 4.2 | 0.3 Al(n-C8H17)3 | 27 | 85 | 2 | 270 | 0.39 | 17.4 | 360 | 0.3 |
| 23 | b7 | 1 l | 4.2 | 0.3 Al isoprenyl | 27 | 85 | 2 | 317 | 0.94 | 17.0 | 398 | 0.8 |
| 24 | b8 | 1 l | 4.2 | 0.3 Al(n-C8H17)3 | 27 | 85 | 2 | 315 | 1.1 | 17.0 | 360 | 2.0 |
| D | c3 | 5 l | 9 | 2 Al(n-C8H17)3 | 30 | 85 | 1.5 | 1040 | 0.76 | 13.7 | 380 | 0.1 |
| E | c3 | 5 l | 9 | 2 Al isoprenyl | 30 | 85 | 1.5 | 1080 | 1.4 | 13.2 | 395 | 0.1 |
| F | c4 | 5 l | 9.2 | 2 Al(n-C8H17)3 | 30 | 85 | 1.5 | 1060 | 0.52 | 14.8 | 360 | 0.5 |
| G | c4 | 5 l | 9.2 | 2 Al isoprenyl | 30 | 85 | 1.5 | 1080 | 1.4 | 14.3 | 370 | 0.6 |

[1] bonded to the catalyst solid
[2] Polyethylene

TABLE 3

| Examples and Comparison Examples | Catalyst prepared according to | Auto-clave | mg bonded Ti[1] | ml AlR3 | Vol. % H2 in gas space | °C. | Time in hours | gm PE[2] | MFI5 (Powder) | F21.6 | Bulk density g/l | Proportions of fines <100 μm in % by weight |
|---|---|---|---|---|---|---|---|---|---|---|---|---|
| 25 | (b)9 | 1 l | 3.5 | 0.3 Al isoprenyl | 27 | 85 | 2 | 340 | 0.72 | 17.8 | 430 | 0 |
| 26 | (b)9 | 1 l | 3.5 | 0.3 Al(n-C8H17)3 | 27 | 85 | 1¾ | 295 | 0.69 | 18.6 | 352 | 0.1 |
| 27 | (b)9 | 5 l | 16 | 2 Al isoprenyl | 24 | 90 | 1¼ | 1220 | 1.2 | 17.2 | 380 | 0.1 |
| 28 | (b)9 | 5 l | 16 | 2 Al isoprenyl | 14 | 90 | 1 | 1300 | 0.4 | 17.3 | 385 | 0.2 |
| 29 | (b)9 | 5 l | 16 | 2 Al(n-C8H17)3 | 24 | 90 | 1½ | 1075 | 1.2 | 17.3 | 340 | 0.1 |
| 30 | (b)9 | 5 l | 16 | 2 Al(n-C8H17)3 | 17 | 85 | 1½ | 1175 | 0.15 | 20.7 | 330 | 0.2 |
| 31 | (b)9 | 5 l | 16 | 2 Al(n-C8H17)3 | 24 | 85 | 1½ | 1185 | 0.35 | 18.3 | 330 | 0.3 |
| 32 | (b)(10 aa) | 1 l | 3.3 | 0.3 Al isoprenyl | 27 | 90 | 2 | 295 | 0.82 | 17.7 | 450 | 0.2 |
| 33 | (b)(10 aa) | 1 l | 3.3 | 0.1 Al(n-C8H17)3 + 0.3 Al isoprenyl | 27 | 90 | 2 | 301 | 1.1 | 17.5 | 435 | 0.3 |
| 34 | (b)(10 ab) | 1 l | 3.3 | 0.3 Al isoprenyl | 27 | 90 | 2 | 270 | 0.62 | 17.1 | 405 | 0.2 |
| 35 | (b)(10 ab) | 1 l | 3.3 | 0.3 Al(n-C8H17)3 | 27 | 90 | 2 | 195 | 0.38 | 19.5 | 405 | 0.3 |
| 36 | (b)(11 ba) | 1 l | 3.3 | 0.3 Al isoprenyl | 27 | 90 | 1¾ | 320 | 1.2 | 18.3 | 359 | 0.2 |
| 37 | (b)(11 ba) | 1 l | 3.3 | 0.3 Al(n-C8H17)3 | 27 | 90 | 1½ | 295 | 2.6 | 17.1 | 342 | 0.2 |
| 38 | (b)(11 ba) | 5 l | 13.2 | 2 Al isoprenyl | 17 | 90 | 1 | 1210 | 0.31 | 20.0 | 353 | 0 |
| 39 | (b)(11 bb) | 1 l | 3.5 | 0.3 Al isoprenyl | 27 | 90 | 1¾ | 305 | 2.3 | 18.2 | 350 | 0 |
| 40 | (b)(11 bb) | 1 l | 3.5 | 0.3 Al(n-C8H17)3 | 27 | 90 | 1¾ | 300 | 2.8 | 16.7 | 351 | 0.1 |
| 41 | (b)(11 bc) | 1 l | 3.5 | 0.3 Al isoprenyl | 27 |  | 2 | 245 | 0.8 | 17.9 | 352 | 0.1 |
| 42 | (b)(12 ca) | 1 l | 3.4 | 0.3 Al isoprenyl | 27 | 90 | 2 | 254 | 0.53 | 18.1 | 402 | 0.4 |
| 43 | (b)(12 ca) | 1 l | 3.4 | 0.3 Al(n-C8H17)3 | 27 | 90 | 2 | 273 | 1.0 | 17.9 | 394 | 0.2 |
| 44 | (b)(12 cb) | 1 l | 3.3 | 0.3 Al isoprenyl | 27 | 90 | 2 | 290 | 1.3 | 17.2 | 416 | 0.2 |
| 45 | (b)(12 cb) | 1 l | 3.3 | 0.3 Al(n-C8H17)3 | 27 | 90 | 2 | 308 | 1.0 | 19.1 | 415 | 0.2 |
| H | (c)5 | 1 l | 2.4 | 0.3 Al isoprenyl | 24 | 85 | 2 | 260 | 0.95 | 12.9 | 390 | 0.1 |
| I | (c)5 | 1 l | 2.4 | 0.3 Al(n-C8H17)3 | 24 | 85 | 2 | 233 | 0.68 | 14.5 | 370 | 0.1 |
| J | (c)5 | 5 l | 9.5 | 2 Al isoprenyl | 30 | 85 | 1.5 | 1020 | 1.2 | 13.9 | 380 | 0.2 |

[1] bonded to the catalyst solid
[2] Polyethylene

The preceding specific embodiments are illustrative of the practice of the invention. It is to be understood, however, that other expedients known to those skilled in the art or disclosed herein, can be employed without departing from the spirit of the invention or the scope of the appended claims.

I claim:

1. An improvement in the process for the polymerization of an at least one α-olefin comprising reacting said α-olefin under elevated temperatures and pressures in the presence of a solid polymerization catalyst consisting essentially of a solid compound containing (1) element(s) of the IV and/or V sub-group(s) of the Mendeleev Periodic Table, (2) magnesium, (3) halogen, (4) oxygen, and possibly (5) element(s) of the II and/or III main group(s) of the Mendeleev Periodic Table, which solid compound is activated with at least one organometallic compound where said metal is from the II and/or III main group(s) of the Mendeleev Periodic Table, and recovering a polymerizate, the improvement consisting of preparing said solid compound prior to activation, by reacting a primary solid containing magnesium and halogen prepared from at least one hydrocarbon-soluble magnesium compound and at least one halogen compound selected from the group consisting of a chloroalkane having from 1 to 6 carbon atoms of which at least one carbon atom has at least two directly bonded chlorine atoms, a carbon chloride compound having from 1 to 6 carbon atoms, and mixtures thereof, in two successive and separate reacting stages A and B, in either order, where a solid based on magnesium compound(s) is reacted in reaction stage A in suspension in at least one liquid hydrocarbon with
(i) an alcohol selected from the group consisting of tert.-butanol, isopropanol and mixtures thereof, and
(ii) at least one halogen-containing titanium compound of the formula:

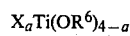

$X_a Ti(OR^6)_{4-a}$ wherein X represents halogen, $R^6$ is a substituent selected from the group consisting of alkyl having from 1 to 8 carbon atoms and hydrocarbon aryl having from 6 to 8 carbon atoms, and a is 2, 3 or 4, and, in reaction stage B, a solid based on magnesium compound(s) in suspension in at least one liquid hydrocarbon is reacted with (i) at least one halogen-containing metal titanium compound of the formula:

$$X'_b Ti(OR^7)_{4-b}$$

wherein X' represents halogen, R⁷ represents a substituent selected from the group consisting of alkyl having from 1 to 8 carbon atoms and hydrocarbon aryl having from 6 to 8 carbon atoms, and b is 2, 3, or 4, and (ii) at least one organoaluminum compound, whereby a polymerizate is recovered having a broad molecular-weight distribution.

2. The process of claim 1 wherein said reaction stage B occurs before said reaction stage A.

3. The process of claim 1 wherein said reaction stage A occurs before said reaction stage B.

4. The process of claim 1 wherein said catalyst solid, after completion of reaction stages A and B, is further washed with at least one liquid hydrocarbon, dispersed in at least one liquid hydrocarbon and reacted with at least one organometallic compound of metals of the II and/or III main group(s) of the Mendeleev Periodic Table, dissolved in at least one liquid hydrocarbon.

5. The process of claim 4 wherein said at least one organometallic compound is at least one organoaluminum compound.

6. The process of claim 1 wherein said catalyst solid, after completion of reaction stages A and B, is further suspended in at least one liquid hydrocarbon, aged for at least one hour at a temperature of from 50° C. to 100° C., and then washed with at least one liquid hydrocarbon.

7. The process of claim 1 or 2 or 3 wherein said organometallic compound where said metal is from the II and/or III main group(s) of the Mendeleev Periodic Table, as activator, is at least one organoaluminum compound selected from the group consisting of (1) compounds of the formula $$Al\ R_z^8\ Y_{3-z}$$

wherein R₈ represents a member selected from the group consisting of alkyl having from 1 to 20 carbon atoms, hydrocarbon aryl having from 6 to 20 carbon atoms and mixtures thereof, Y represents a member selected from the group consisting of hydrogen, halogen alkoxy having from 1 to 20 carbon atoms, siloxy having from 1 to 20 carbon atoms and hydrocarbon aryl having from 6 to 20 carbon atoms, and z is 2 or 3, (2) oligomeric alkyl aluminum compounds, and (3) mixtures thereof.

8. The process of claim 1 wherein the solid compound is purified after each stage.

9. The process of claim 8 wherein said purification after each stage is by washing with liquid hydrocarbons.

10. The process of claim 9 wherein said washing with liquid hydrocarbons is continued until said catalyst is substantially freed from soluble compounds.

11. The process of claim 1 wherein said α-olefin is a member selected from the group consisting of ethylene and mixtures of ethylene with up to 10 mol percent of α-alkenes having from 3 to 6 carbon atoms.

12. An improvement in the process for the polymerization of an at least one α-olefin comprising reacting an α-olefin selected from the group consisting of ethylene and mixtures of ethylene with up to 10 mol percent of α-alkenes having from 3 to 6 carbon atoms under elevated temperatures and pressures in the presence of a solid polymerization catalyst consisting essentially of a solid compound containing (1) element(s) of the IV and/or V sub-group(s) of the Mendeleev Periodic Table, (2) magnesium, (3) halogen, (4) oxygen, and possibly (5) element(s) of the II and/or III main group(s) of the Mendeleev Periodic Table, which solid compound is activated with at least one organometallic compound where said metal is from the II and/or III main group(s) of the Mendeleev Periodic Table, and recovering a polymerizate, the improvement consisting of preparing said solid compound prior to activation, by reacting a primary solid containing magnesium and halogen prepared from at least one hydrocarbon-soluble magnesium compound and at least one halogen compound selected from the group consisting of a chlorohydrocarbon having from 1 to 6 carbon atoms of which at least one carbon atom has at least two directly bonded chlorine atoms, a carbon chloride compound having from 1 to 6 carbon atoms, and mixtures thereof, in two successive and separate reacting stages A and B, in either order, where a solid based on magnesium compound(s) is reacted in reaction stage A in suspension in at least one liquid hydrocarbon with
(i) an alcohol selected from the group consisting of tert.-butanol, isopropanol and mixtures thereof, and
(ii) at least one halogen-containing titanium compound of the formula:

$$X_a Ti(OR^6)_{4-a}$$

wherein X represents halogen, R⁶ is a substituent selected from the group consisting of alkyl having from 1 to 8 carbon atoms and hydrocarbon aryl having from 6 to 8 carbon atoms, and a is 2, 3 or 4, and, in reaction stage B, a solid based on magnesium compound(s) in suspension in at least one liquid hydrocarbon is reacted with
(i) at least one halogen-containing metal titanium compound of the formula:

$$X'_b Ti(OR^7)_{4-b}$$

wherein X' represents halogen, R⁷ represents a substituent selected from the group consisting of alkyl having from 1 to 8 carbon atoms and hydrocarbon aryl having from 6 to 8 carbon atoms, and b is 2, 3, or 4, and
(ii) at least one organoaluminum compound, whereby a polymerizate is recovered having a broad molecular-weight distribution.

* * * * *